United States Patent [19]

Yamazaki et al.

[11] 4,057,166
[45] Nov. 8, 1977

[54] DRAWER TYPE ASH RECEIVER

[75] Inventors: Shinichiro Yamazaki, Toyota; Teruyuki Hanabashi, Owariasahi, both of Japan

[73] Assignee: Aisin Seiki Kabushiki Kaisha, Japan

[21] Appl. No.: 734,726

[22] Filed: Oct. 22, 1976

[30] Foreign Application Priority Data

Oct. 31, 1975 Japan ............................ 50-149534[U]

[51] Int. Cl.² ....................... B65D 7/24; B65D 43/20; A24F 19/00
[52] U.S. Cl. ....................................... 220/8; 220/345; 131/241
[58] Field of Search ................ 220/8, 1 H, 85 H, 345, 220/348, 351; 206/267; 131/231, 240 R, 241, 242; 224/29 K

[56] References Cited

U.S. PATENT DOCUMENTS

| 2,245,882 | 6/1941 | Visser | 131/241 |
| 2,503,693 | 4/1950 | VanLennep | 220/345 X |
| 2,553,138 | 5/1951 | Hendricks | 131/241 X |
| 2,623,314 | 12/1952 | Lombard | 220/345 X |
| 2,809,877 | 10/1957 | Hammesfahr | 131/241 X |
| 3,049,224 | 8/1962 | Fredette et al. | 220/345 X |
| 3,126,444 | 3/1964 | Taylor | 220/345 X |
| 3,179,278 | 4/1965 | Cohen | 220/8 |

Primary Examiner—William Price
Assistant Examiner—Steven M. Pollard
Attorney, Agent, or Firm—Berman, Aisenberg & Platt

[57] ABSTRACT

In a drawer type ash receiver assembly, a supporting member for a container is formed in a half-box shape from sheet metal by stamping to have opposite-spaced side flanges and a rear end flange flared downwardly and outwardly in one piece therefrom. The supporting member includes a pair of receiving arms extended inwardly from each of the forward ends of the side flanges, and the container includes opposite spaced side rims and a rear end rim which are provided at the outsides thereof with taper surfaces engageable with the flared flanges of the supporting member and of which the side rims are slidably received at the bottom surfaces thereof by resilient means on the receiving arms.

8 Claims, 4 Drawing Figures

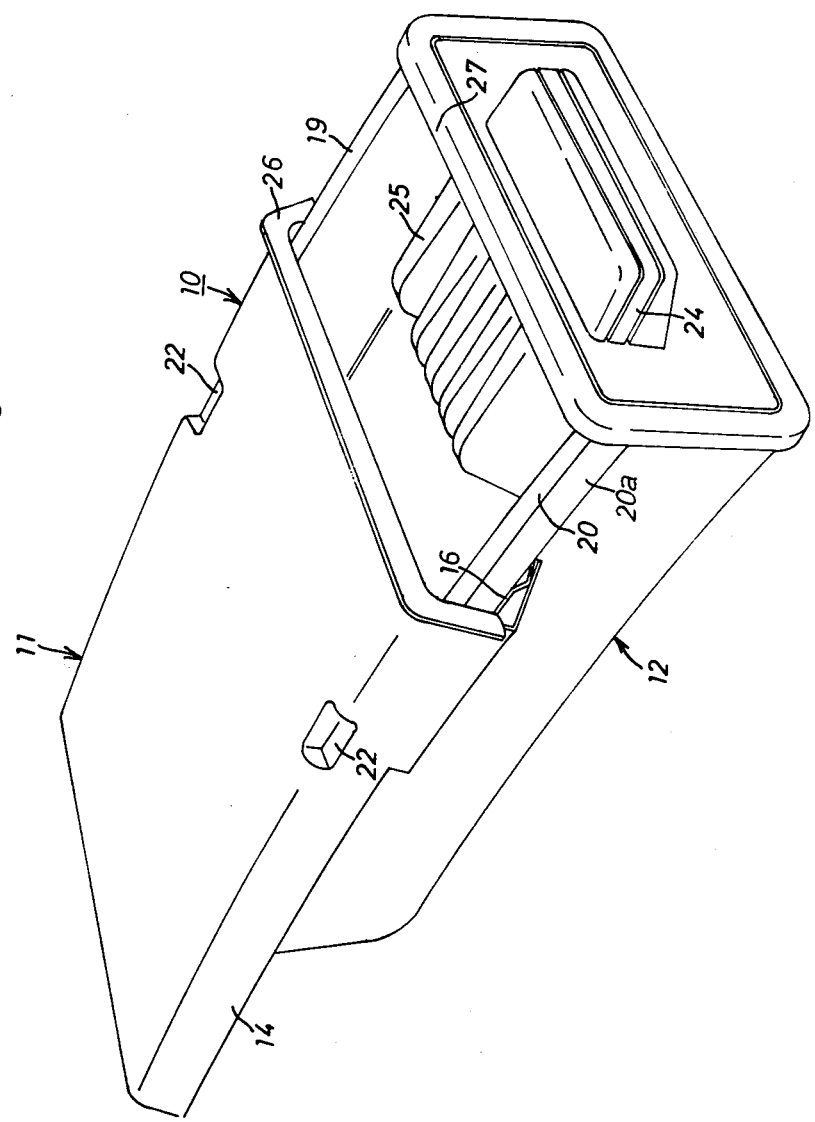

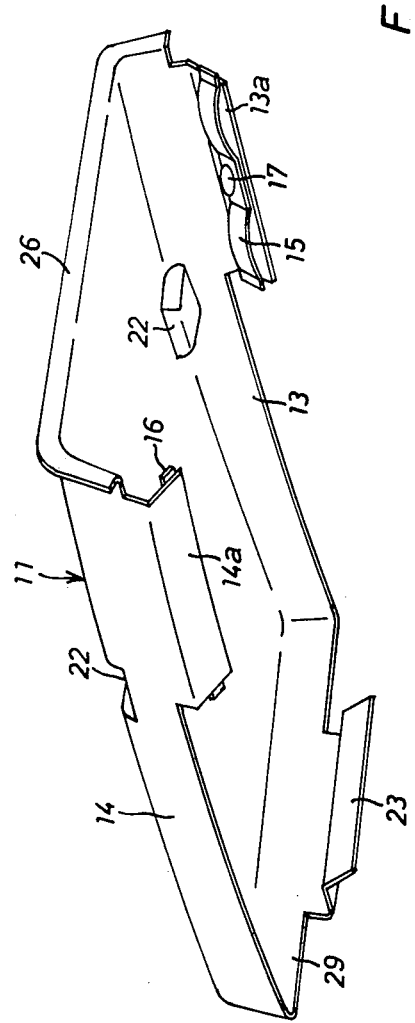
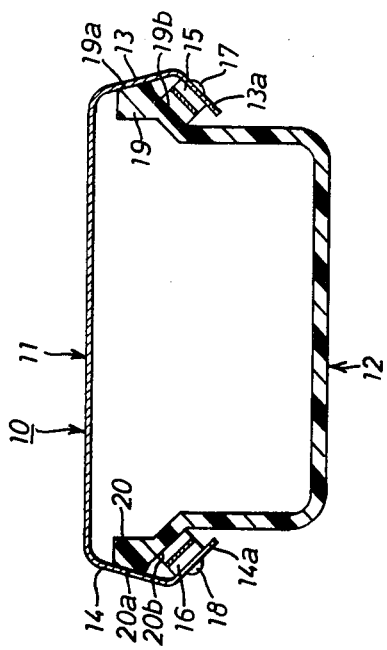

DRAWER TYPE ASH RECEIVER

BACKGROUND OF THE INVENTION

The present invention relates to ash receivers to receive a lighted cigar or cigarette therein and put out the same, and more particularly to a drawer type ash receiver adapted to be secured to an instrument panel of a vehicle.

In known drawer type ash receivers, a container in the form of a drawer is telescopically suspended by a stationary supporting member secured to the instrument panel in such a manner that the container is air-tightly covered by the supporting member in fully closed position to extinguish sparks of cigar or cigarette ends within the container. The supporting member is generally formed in a half-box shape from sheet metal cut in a proper shape by bending both side edges and the closed end edge. There are, however, undesired slit spaces between the bent side flanges and the bent flange at the closed end. The slit spaces decrease the air-tightness of the container in fully-closed position. This creates a danger that cigar or cigarette ends stored in the container may be ignited by a fresh butt thrown in before it is fully extinguished, since the fresh butt may keep smoking and resume a fully-lit condition with the help of the air supplied through the slit spaces. To avoid this kind of danger, some sealing members have to be additionally adapted to ensure the air-tightness of the closed container.

SUMMARY OF THE INVENTION

The primary object of the present invention is to provide a drawer-type ash receiver assembly in which a supporting member for a container is formed in a half-box shape from sheet metal by stamping to have closed corners so as to avoid the above-mentioned drawbacks.

Another object of the present invention is to provide a drawer type ash receiver assembly, having the above-mentioned characteristics, in which the formation of the supporting member can easily and precisely be finished by stamping.

BRIEF DESCRIPTION OF THE DRAWINGS

Additional objects and advantages of the present invention are readily apparent from the following detailed description of a preferred embodiment thereof when taken together with the accompanying drawings, in which:

FIG. 1 is a perspective view of a drawer type ash receiver according to the present invention, showing a container in open position;

FIG. 2 is a perspective view of the disassembled supporting member, showing the interior of the supporting member;

FIG. 3 illustrates a cross-section of the ash receiver shown in FIG. 1; and

DESCRIPTION OF THE PREFERRED EMBODIMENT

Figure 4:
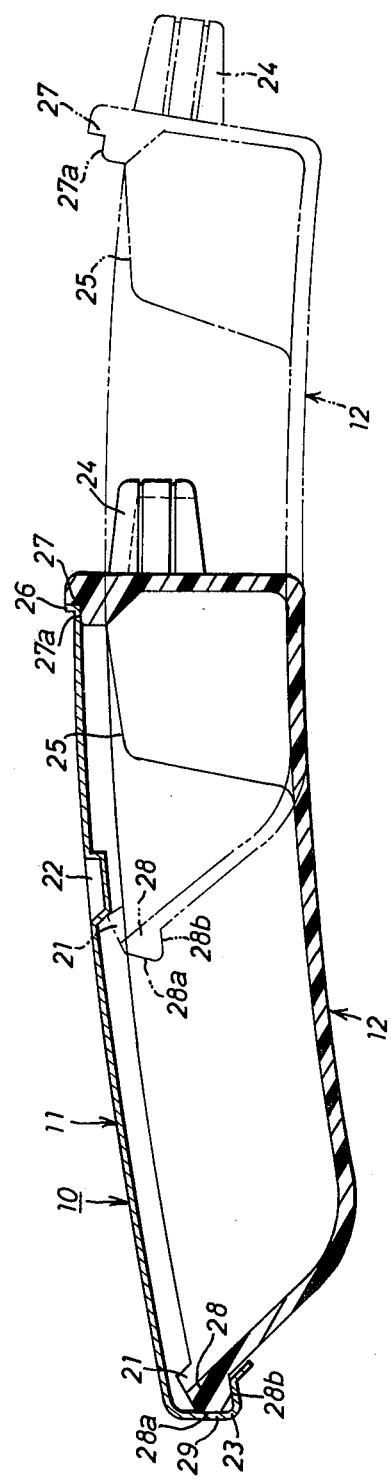
FIG. 4 illustrates a longitudinal section of the ash receiver.

In a preferred embodiment of the present invention illustrated in FIGS. 1 to 4, an ash receiver assembly 10 comprises a supporting member 11 adapted to be secured to the under side of an instrument panel of a vehicle and an ash container 12 in the form of a drawer telescopically suspended by the supporting member 11.

The supporting member 11 is formed in a half-box shape from sheet metal by stamping to have a trapezoidal cross-section, as best shown in FIG. 2. In this formation, opposite-spaced sides flanges 13, 14 and a closed end flange 29 of the supporting member 11 are formed in one piece to provide closed corners therebetween and are downwardly and outwardly flared to circumscribe the three flanged rims 19, 20 and 28 of the container 12. The supporting member 11 is provided at the forward portion thereof with opposite spaced arms 13a and 14a which are inwardly extended from the respective side flanges 13 and 14 to provide a carrier for slidable movement of the container 12. Each of the arms 13a and 14a is provided at the inside thereof with bowed leaf springs 15 and 16 which are secured at the center thereof to each of the arms 13a and 14a by rivets 17 and 18.

The ash container 12 is made of heat-resistant synthetic resin and includes a finger knob 24 formed at the front thereof and a snuffer element 25 formed at the inside thereof to facilitate putting out cigars or cigarettes. Each of the flanged side rims 19 and 20 of the container 12 is provided at the outside thereof with tapered surfaces 19a and 20a which are formed complementary to the flared side flanges 13 and 14 of the supporting member 11 and extend from the forward end to the rearward end of the container 12. Each of the flanged side rims 19 and 20 is further provided at the bottom side thereof with taper surfaces 19b and 20b which are resiliently received by the opposite spaced arms 13a and 14a of the supporting member 11 by way of the leaf springs 15 and 16 to provide slidable engagement of the outside tapered surfaces 19a and 20a of the container 12 against the flared side flanges 13 and 14 of the supporting member 11.

At the rear end of the container 12, a pair of stop projections 21 are formed at both sides of the rear flanged rim 28 to be engageable with a pair of detents 22 provided on the forward region of the supporting member 11. The stop projections 21 engage the detents 22 to limit the outward movement of the container 12 when the container 12 is pulled outwardly into open position, as indicated by the dotted lines in FIG. 4. The rear flanged rim 28 is also provided with an end taper surface 28a complementary to the closed end flange 29 of the supporting member 11 and further provided with a bottom surface 28b engageable with a holding lug 23 which is extended inwardly from the closed end flange 29 of the supporting member 11. The resilient engagement of the rear flanged rim 28 against the holding lug 23 acts to secure the container 12 in fully closed position without rattling. Furthermore, the container 12 is provided at the forward end thereof with a stepped portion 27 engageable with a front end flange 26 of the supporting member 11. The stepped portion 27 has a flat surface 27a which is air-tightly engaged with the inside wall of the supporting member 11 due to biasing force of the leaf springs 15 and 16.

In practical use of the ash receiver assembly, the supporting member 11 is secured to the under side of the instrument panel (not shown) in the substantially horizontal direction, and the container 12 is telescopically supported on the opposite spaced arms 13a and 14a of the supporting member 11 with the leaf springs 15 and 16 depressed. In this assembly, when the container 12 is in fully-closed position, the rear flanged rim 28 of the container 12 is resiliently engaged with the holding lug 23 of the supporting member 11 so that the front stepped portion 27 of the container 12 is air-tightly engaged with the front end flange 26 of the supporting member 11, and the three flanged rims 19, 20 and 28 of the container 12 are also air-tightly engaged with the flared flanges 13, 14 and 29 of the supporting member 11 to hermetically close the interior of the container 12.

When the container 12 is pulled outwardly by the knob 24 into fully-open position, as indicated by the dotted lines in FIG. 4, the container 12 is released from the resilient engagement of the rear flanged rim 28 against the holding lug 23 of the supporting member 11 and engages at the rear projections 21 thereof with the detents 22 of the supporting member 11 to limit the outward movement of the container 12. The outward movement of the container 12 is guided by frictional engagements of the side flanged rims 19 and 20 of the container 12 against the flared side flanges 13 and 14 of the supporting member 11. To remove the container 12 completely for purposes of emptying the contents thereof, the forward end of the container 12 is merely moved upwardly in fully-open position so that the container 12 rotates counterclockwise around the front end 26 of the supporting member 11 to separate the projections 21 of the container 12 downwardly from the detents 22 of the supporting member 11.

In order to replace the container 12 after removal, it is simply necessary to insert the container 12 into the supporting member 11 until the projections 21 over-ride the detents 22 in such a manner that the side flanged rims 19 and 20 of the container 12 are resiliently received at the bottom tapered surfaces 19b and 20b thereof by the springs 15 and 16 on the arms 13a and 14a. When the container 12 is pushed into fully closed position, the interior of the container 12 is air-tightly closed by means of the side and closed-end flanges 13, 14 and 29 of the supporting member 11 circumscribing the three flanged rims 19, 20, and 28 of the container 12 and the front end flange 26 engaging the stepped portion 27 of the container 12 so as to put out sparks of butts stored in the container. In this instance, the flat surface 27a of the stepped portion 27 of the container 12 engages with the inner surface of the front end of the supporting member 11 in spite of any assembling tolerance to ensure the air-tightness of the container 12.

As already described, the construction shown is only an example of how the present invention can be put into practice. The present invention is, however, not restricted thereto, but modifications of the construction illustrated and also other forms of construction are possible. For example, the detents 22 of the supporting member 11 and the projections 21 of the container 12 may be arranged such that the container 12 can be removed by downward displacement thereto.

What is claimed is:

1. In an ash receiver assembly comprising a container in the form of a drawer and a supporting member from which the container is telescopically suspended and which provides a cover over said container when the latter is in a fully-closed position;

the improvement wherein the supporting member has a front end and a rear end and includes, in one piece, opposite-spaced side flanges, each having a forward end, and a rear end flange, the spaced side flanges being flared downwardly and outwardly and extending substantially along the whole length of said container, and a pair of receiving arms which extend inwardly from respective forward ends of the side flanges, each of the receiving arms having resilient means thereon; said container has opposite-spaced side rim means to engage with the flared side flanges and rear end rim means to engage with the rear end flange, the side rim means having outer tapered surfaces which are slidably guided by the flared side flanges of said supporting member and which are urged upwardly from lower surfaces thereof by the resilient means on said receiving arms to ensure air-tightness of said container when the latter is in the fully-closed position.

2. An ash receiver assembly as claimed in claim 1, wherein the side rim means of said container have bottom surfaces which opposite spaced tapered surfaces extending downwardly and inwardly and wherein the receiving arms of said supporting member are downwardly and inwardly extended with a tapered angle to slidably receive the bottom tapered surfaces of the said side rim means thereon.

3. An ash receiver assembly as claimed in claim 1, wherein said container has a front member which is provided with a stepped portion which is engageable with a short vertical flange formed at the front end of said supporting member, said stepped portion including a flat surface means to engage in air-tight fashion with inner surface of the front end of said supporting member when said container is in fully-closed position.

4. An ash receiver assembly as claimed in claim 1, wherein said supporting member is provided at the rear end flange thereof with a holder to receive the rear end rim means of said container when the container is in fully-closed position.

5. An ash receiver assembly as claimed in claim 4, wherein said supporting member has a pair of detents at its forward region and each side rim means of said container has a rear end with a projection means to engage with one of said detents to limit outward movement of the container when said container is pulled outwardly into a fully-open position.

6. An ash receiver assembly as claimed in claim 1, wherein said supporting member is formed from sheet metal by stamping to have a trapezoidal at cross-section.

7. An ash receiver assembly as claimed in claim 1, wherein each of said resilient means is a bowed leaf spring secured on each of the receiving arms to urge said container upwardly.

8. An ash receiver assembly as claimed in claim 1, and wherein the rear end flange of said supporting member is flared downwardly and outwardly and the rear end rim means of said container has an outer tapered surface means to engage in an air-tight fashion with the flared rear end flange of said supporting member when said container is in the fully-closed position.

* * * * *